Figures 1, 2:
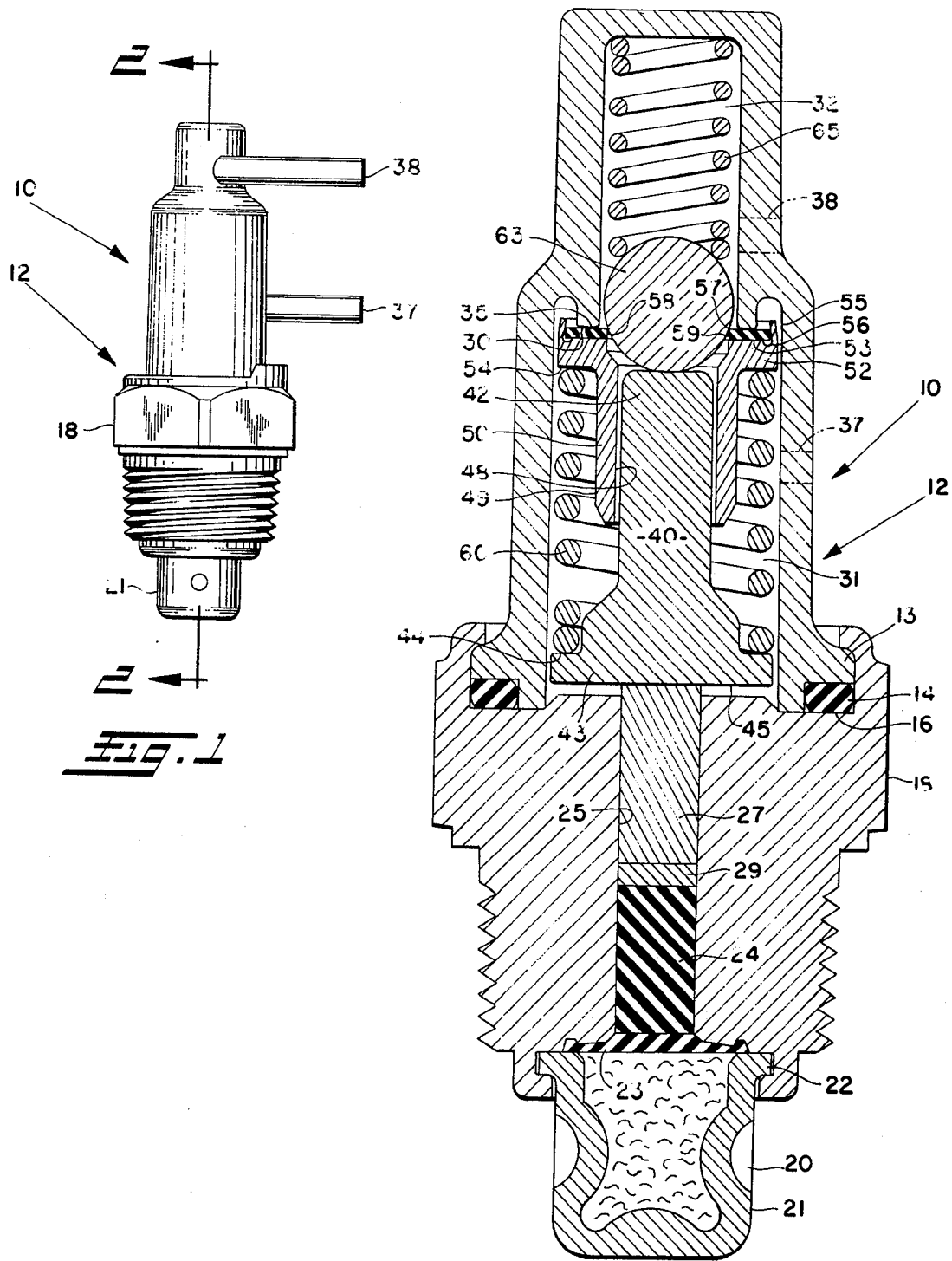

United States Patent [19]
Obermaier et al.

[11] 3,887,159
[45] June 3, 1975

[54] PORTED VALVE AND SEALING MEANS THEREFOR

[75] Inventors: Frank E. Obermaier, Lombard; Arthur A. Scott, Mount Prospect, both of Ill.

[73] Assignee: Eaton Corp., Cleveland, Ohio

[22] Filed: May 21, 1973

[21] Appl. No.: 362,557

[52] U.S. Cl. .................. 251/11; 251/362; 251/363; 251/81; 123/117 A
[51] Int. Cl. ............................................. F03g 7/06
[58] Field of Search ............. 251/362, 363, 323, 84, 251/11; 137/DIG. 2, 627.5; 236/100; 123/117 A

[56] References Cited
UNITED STATES PATENTS

| | | | |
|---|---|---|---|
| 2,008,657 | 7/1935 | Deiller | 137/DIG. 2 |
| 2,693,821 | 11/1954 | Cornelius | 251/363 X |
| 3,186,430 | 6/1965 | Koutnik | 251/362 X |
| 3,400,698 | 9/1968 | Kelly | 123/117 A |

Primary Examiner—Arnold Rosenthal
Attorney, Agent, or Firm—Teagno & Toddy

[57] ABSTRACT

A positive sealing, self-adjusting valve seat is provided for a ported valve having an especially configured valve chamber therein. The chamber includes a shouldered portion extending therein to divide same into a first chamber portion communicating with a first port and a second chamber portion communicating with a second port. The valve seat is defined by an annular resilient disc member abutting the shoulder and housed in an especially configured retainer seat. The retainer seat is constantly spring biased to maintain the resilient disc in sealing engagement with the shoulder and thus prevents leakage between the first and second chamber portions. Valving is accomplished by a ball-type valve normally spring biased into sealing engagement with the opening in the valve seat and unseated therefrom by actuating means operated in accordance with a condition sensing device.

5 Claims, 2 Drawing Figures

PATENTED JUN 3 1975

3,887,159

PORTED VALVE AND SEALING MEANS THEREFOR

This invention relates generally to ported valves and, more particularly, to a positive sealing, self-adjusting valve seat employed therein.

The invention is particularly applicable to a two-port, thermal-actuated valve which controls the vacuum porting for actuation of an exhaust emissions' control device used in an automotive vehicle and will be described with particular reference thereto. However, it will be appreciated by those skilled in the art that the subject invention has broader applications and may be applied to any type of ported valve actuated by a condition sensing device whereby vacuum or pressure is ported to any type of a pressure-operated device.

Heretofore, valve seats have primarily been manufactured from aluminum and sealed by a steel ball seated against a central opening in the valve seat. The valve seat was press fitted into the valve chamber and in many instances leakage would occur between the metal seating surfaces if the valve seat became warped or if it was cocked during assembly. To overcome this tendency of the seat to leak, a resilient valve seat has been applied to the metal valve seat body and said body was press fitted into the valve chamber. While such arrangement initially prevented leakage in time, the resilient material of the seat would take a permanent set allowing leakage to occur from one portion of the valve chamber to another.

It is thus a principal object of the subject invention to provide a resilient valve seat in a ported valve which is self-adjusting to provide positive sealing means even though the resilient material of the seat may take a permanent set during usage.

In accordance with the subject invention this object is achieved by providing a ported valve comprising a housing defining a valve chamber therein. The chamber is shouldered to define a first chamber portion extending from one side of the shoulder which ommunicates with a first valve port and a second chamber portion extending from the other side of the shoulder which comunicates with a second port. A valve seat is provided in the form of a resilient, annular disc which is retained in an especially-configured support member. The resilient seat abuts the shoulder and is maintained in constant sealing engagement therewith by a first spring within the first chamber portion exerting pressure against the support member. This pressure is sufficient to seal the valve seat against the shoulder even though valve seat may take a permanent set in time. Valving is accomplished by a balltype valve member seated within the central opening of the resilient valve seat and maintained normally in sealing engagement therewith by a second spring within the second chamber portion.

In accordance with another feature of the subject invention, the support member for the resilient valve is sized to slidingly fit within the valve body. Additionally the retainer is especially formed to retain the resilient disc therein prior to inserting same within the valve body.

It is thus a secondary object of the subject invention to provide a positive sealing valve seat within a ported valve which permits the valve design and associated parts to be such that the valve can be easily assembled in a shorter time than heretofore possible.

The invention may take physical form in certain parts and arrangements of parts, a preferred embodiment of which will be described in detail and illustrated in the accompanying drawing which form a part hereof and wherein:

FIG. 1 is a side elevation view of a twoport valve employing the subject invention; and FIG. 2 is a sectioned view taken along Line 2—2 of FIG. 1

Referring now to the drawing wherein the showings are for the purpose of illustrating a preferred embodiment of the invention only and not for the purpose of limiting the same, FIGS. 1 and 2 show a vacuum control valve 10 which includes a valve housing 12 having a radial flange 13 at its lower end with a seal 14 recessed therein and extending about flange 13. Seal 14 is in sealing engagement with a plain upper face 16 of a threaded coupling member 18. Coupling 18 is crimped or otherwise secured to flange 13 to thus provide an airtight connection between the flange and the coupling. Threaded coupling member 18 is adapted to be threaded in a cylinder head of an internal combustion engine and thereby position a thermally-responsive element 20 on the end of coupling 18 in the water jacket of the engine (not shown).

The thermally-responsive element 20 is shown as being a solid-fill or power-type of thermally-responsive element. Element 20 includes a casing 21 containing a fusible thermally-expansible material such as wax or a mixture of wax in a powder metal heat conducting material, with or without a binder, to attain a material which will expand in its fusion range, at a temperature range selected for operation of the valve, in a manner well known to those skilled in the art and as such is not herein shown or described further. Casing 21 has a radial flange 22 extending outwardly from the upper wall thereof and abutting a resilient diaphragm 23. Flange 22 and diaphragm 23 are sealed to the coupling member 18 by crimping an axially-extending annular portion of the coupling member over flange 22. A piston 24 is slidable guided in a bore 25 in threaded coupling member 18 and is spaced from an extensible power member 27 which is movable along bore 25 as by a spacer 29.

Valve housing 12, including the plain upper face 16 of threaded coupling member 18, defines a closed valve chamber therein which has an inwardly spaced shoulder 30 therein to define first and second cylindrical valve chamber portions 31,32 extending from opposite sides of shoulder 30. More particularly, shoulder 30 is an internal, annular rib within housing 12 having an apex 35 which defines a line of demarcation dividing the first chamber portion 31 from the second chamber portion 32. Communicating with first chamber portion 31 is an inlet port 37 and cummunicating with second chamber portion 32 is an outlet port 38 (see FIG. 1).

Disposed within the first chamber portion 31 is a push rod member 40 having a cylindrical top end 42 and a radially-flanged bottom end 43 which is shouldered about its external periphery as at 44 to define a spring seal. A base 45 adjacent the bottom end 43 of the push rod is flat and is thus adapted to be in contact with the extensible power member 27 for common movement therewith.

The top end 42 of the push rod is guided for linear motion by a bore 48 formed in a cylindrical bottom portion 49 of a resilient disc suppport member 50. Support member 50 includes an annular base flange portion 52 extending from the top end of bottom portion 49 with its opening communicating with the bore 48 formed in bottom portion 49. Flange 52 has a generally flant, radially-extending top surface 53 and a generally flat, radially-extending bottom surface which forms a shoulder 54 with bottom portion 40. Extending upward from the outer portion of top surface 53 is an annular rim 55 which importantly is tapered inwardly over top surface 53 to define a frusto-conical surface.

An annular resilient disc or valve seat 58 of approximately the same size as the top surface 53 of glange portion 52 rests on the top surface and is retained within the support member 50 by the inwardly-tapered rim 55. It should be also noted that the top surface 53 is relieved as at 56 at its juncture with rim 55 so that the valve seat 58 may be easily applied to support member 50 prior to valve assembly. More specifically, because the rim diameter is smaller than the diameter of the valve seat except at its juncture with surface 52, the relief 56 provides an additiona area whereby a portion of the outer periphery of the seat 58 can be pushed into the relief by suitable means to assure easy assembly of the seat 58 within support member 50.

Valve seat 58 is maintained in sealing engagement with internal shoulder 30 in valve housing 12 by means of a retractable thermal element spring 60 which is seated between the shouldered surface 54 in the support member 50 and the shouldered surface 44 in the push rod 40. Importantly the precompression of spring 60 is such that if the resilient material of valve seat 58 undergoes a permanent set, the spring force will still maintain the valve seat 58 in sealing engagement with the shoulder 30.

Disposed within the second valve chamber portion 32 is a steel ball-type valve member 63 which is normally biased by a valve return spring 65 within the second chamber portion 32 into sealing engagement with an inner edge 57 of valve seat opening 59. In this unactuated position of valve 10, thermal element 20 is in a retracted position and the first chamber portion 31 is sealed from the second chamber portion 32. When thermal element 20 is actuated at a predetermined temperature, extensible power member 27 moves push rod member 40 within the bore 48 of support member 50 to unseat valve member 63 from valve seat 58 and communicate first and second valve chamber portions 31, 32 with one another.

As thus defined, valve 10 is especially suitable for use as a temperature-controlled lockout means in an exhaust emissions' control system employed in automotive vehicles. More particularly a variable source of vacuum ported from the carburetor would be supplied to inlet port 37 and prevented from communicating with the outlet port 38 until a predetermined temperature would be obtained. Outlet port 38 in turn would lead to a vacuum controlled valve directing nitrous oxide components of emissions into the carburetor of the internal combustion engine. A detailed explanation of such a system may be had by reference to pending application entitled "Dual Function Termal Valve", Ser. No. 321,502, filed Jan. 8, 1973 by A. A. Scott and assigned to the present Assignee. The valve illustrated therein is a four-port valve controlling two different vacuum functions and two valves 10 of the present invention may be substituted for the four-port valve illustrated therein to accomplish the same result.

Likewise it will be appreciated by those skilled in the art that the thermal-responsive unit 20 which actuates the push rod 40 is a condition sensing device which may, in turn, be replaced by other actuating means operable upon a predetermined condition such as a solenoid. Furthermore while a two-port valve has been illustrated, the invention is likewise applicable to a multi-ported valve. Thus a second resilient valve seat and valve member according to the present invention could easily be incorporated into the two-port valve illustrated to produce a three-port valve as is readily apparent to those skilled in the art. Alternatively, the type of three-port valve illustrated in U.S. Pat. No. 3,400,698 and assigned to the present Assignee using only one valve seat could be easily modified to incorporate the valve seat arrangement of the subject invention.

Thus it is apparent that many modifications may be incorporated into the valve and also the valve seat arrangement of the subject invention without departing from the spirit or the essence of the invention. It is our intention to include all such modifications and alterations insofar as they come within the scope of the present invention.

It is thus the essence of our invention to provide a resilient valve seat in a ported valve which maintains constant sealing of the valve chamber when the valve is in a closed position even though the valve is subjected to extensive and repated use.

Having thus defined our invention, We claim:

1. A ported valve comprising:

a housing defined a configured chamber therein, and wherein said housing has an internal shoulder extending within aid chamber, said shoulder separating said chamber into said first and second portions and said shoulder is defined as an annular rib having an apex which defines a line of demarcation between said first and second chamber portions, said first chamber portion extending on one side of said shoulder and said second chamber portion extending on the other side thereof;

a first and second port spaced along said hosuing, said first port communicating with the first portion of said chamber and said second port communicating with a second portion of said chamber;

valving means within said chamber isolating said first portion of said chamber from said second portion in a firsts normally-closed position of said valve and providing communication between said first portion and said second portion in a second actuated position of said valve;

said valving means including a resilient valve seat defined as an annular resilient disc within said first portion of said chamber and abutting said shoulder and having a central opening extending therethrough, a support member carrying said seat, said valve seat support member including an annular base portion approximately the size of said valve seat and a rim extending from the periphery of said base, said rim tapering inwardly over said base to retain said valve seat therein, first biasing means including a first spring within said first chamber portion biasing said seat into sealing engagement with said shoulder and contacting said support member to compress said seat into sealing engagement with said first and second portions of said chamber, a ball-type member normally positioned in contact with said opening and said seat, second biasing means contacting said valve member biasing into sealing engagement with said seat and actuating means to displace said valve member from said seat to provide communication between said first and second chamber portions.

2. The ported valve of claim 1 wherein
said support member further includes a cylindrical portion depending from the base thereof, said cylindrical portion having an axially-extending opening therein communicating with the opening in said base portion.

said actuating means includes a push rod member having a cylindrical portion within said opening of said support member and a flanged base portion depending from said cylindrical portion, said flanged base portion having an annular shoulder theron, and said first spring positioned in a precompressed manner between said annular shoulder in said push rod and the side of said annular base portion of said support member opposite the side retaining said valve seat.

3. The ported valve of claim 1 wherein
said support member slidingly fits within said first chamber portion.

4. A ported valve comprising:
a housing defining a valve chamber therin, said housing having an internal shouder extending within said chamber to divide said chamber into a first portion extending on one side of said housing and a second portion on the other side of said housing:
first and second ports spaced along said housing, said first port communicating with said first chamber portion and said second port communicating with said second chamber portion, a resilient valve seat abutting said shouder, and having a central opening extending therethrough, a support member slidingly fits within said first chamber portion carrying said valve seat and having a central opening extending therethrough, said support member beong located within said first chamber portion, first spring means within said first chamber biasing said seat into sealing engagement with said shoulder a ball-type valve member normally contacting said opening in said seat, second spring means in said second chamber portion normally biasing said valve member into sealing engagement with said seat;

a push rod guided for longitudinal movement within said first chamber portion and adapted to contact said valve member; and actuating means including a thermally responsive power element responsive to an operable condition engaging said push rod to unseat said valve member from said seat and provide communication between said first and second chamber portions.

5. The ported valve of claim 4 wherein
said shoulder is defined by an annular rib,
said valve seat is defined by an annular resilient disc,
said support member includes an annular base surface portion sized similarly to said disc and a frustoconical rim portion extending from the outer periphery of said base portion to retain said seat therein.

* * * * *